United States Patent [19]

Konietzny et al.

[11] Patent Number: 4,469,829
[45] Date of Patent: Sep. 4, 1984

[54] AMINO-GROUP BEARING, LOW MOLECULAR WEIGHT 1,3-BUTADIENE POLYMER FOR STABILIZING PLASTICS

[75] Inventors: Alfred Konietzny, Marl; Hans-Dieter Zagefka, Haltern; Konrad Rombusch; Hanns-Jörg Bax, both of Marl, all of Fed. Rep. of Germany

[73] Assignee: Chemische Werke Hüls AG, Marl, Fed. Rep. of Germany

[21] Appl. No.: 524,360

[22] Filed: Aug. 18, 1983

[30] Foreign Application Priority Data

Sep. 14, 1982 [DE] Fed. Rep. of Germany ....... 3233949

[51] Int. Cl.³ .......................... C08K 5/34; C08K 5/51; C08G 59/50; C07D 211/00
[52] U.S. Cl. ..................... 524/103; 524/139; 525/178; 525/181; 525/333.2; 525/423; 528/407; 546/186; 546/187
[58] Field of Search ................ 524/103, 139; 525/178, 525/181, 333.2, 423; 528/407; 546/186, 187

[56] References Cited

U.S. PATENT DOCUMENTS

| | | | |
|---|---|---|---|
| 2,510,777 | 6/1950 | Gray | 524/139 |
| 3,595,829 | 7/1971 | Davy | 524/139 |
| 3,661,874 | 5/1972 | Olson | 525/333.2 |
| 3,684,765 | 8/1972 | Matsui et al. | 524/103 |
| 3,945,953 | 3/1976 | Zondler | 528/407 |

FOREIGN PATENT DOCUMENTS 810737 3/1981 U.S.S.R. .

Primary Examiner—Morton Foelak
Assistant Examiner—Kriellion Morgan
Attorney, Agent, or Firm—Wells & Wells

[57] ABSTRACT

Amino-group bearing, low molecular weight 1,3-butadiene polymers used as stabilizers for molded or unshaped plastics in amounts of 0.01 to 2.0 weight percent referred to the plastic, where the amino-group bearing component is derived from a substituted piperidine having the general formula:

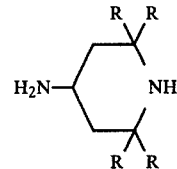

where R represents similar or different alkyl groups having 1 to 3 carbon atoms.

12 Claims, No Drawings

AMINO-GROUP BEARING, LOW MOLECULAR WEIGHT 1,3-BUTADIENE POLYMER FOR STABILIZING PLASTICS

CROSS-REFERENCE TO A RELATED APPLICATION

Applicants claim priority under 35 USC 119 for application P 32 33 949.6, filed Sept. 14, 1982, in the Patent Office of West Germany.

BACKGROUND OF THE INVENTION

The field of the invention is stabilizers for molded and unshaped plastics and the invention is particularly concerned with the use of a low molecular weight 1,3-butadiene polymer containing an amino group as such a stabilizer for molded and unshaped plastics.

The state of the art of stabilizers for plastics may be ascertained by reference to U.S. Pat. Nos. 3,627,775; 4,110,334; and 4,170,588, the disclosures of which are incorporated by reference herein.

The 1,3-polybutadienes containing epoxy groups and useful in the present invention are prepared as disclosed in U.S. Pat. Nos. 3,329,734; 3,321,541; 3,312,752; 3,341,617; 3,428,699; 3,789,090; 3,852,373; 3,983,183; and 4,269,626, the disclosures of which are incorporated by reference herein.

The state of the art of the additives useful in the present invention may be ascertained by reference to the Kirk-Othmer, "Encyclopedia of Chemical Technology", 2nd Edition, Volume 16 (1968) pp. 92–95, particularly the heat and light stabilizers disclosed at page 93, the disclosure of which is incorporated by reference herein.

It is known that derivatives of sterically inhibited piperidine derivatives, in particular of 2,2,6,6-tetramethylpiperidine, are useful as light stabilizers. For instance, U.S. Pat. No. 3,627,775 discloses the alkyl-piperidylesters of dicarboxylic acids, and U.S. Pat. No. 4,110,334 discloses the tetramethyl-diaza-oxa-oxo-dispiroalkanes. U.S. Pat. No. 4,170,588 discloses 1,3-bis-alkylamino-cyclobutenediylium-2,5-diolates as stabilizers for plastics. However, these mostly low molecular weight piperidine derivatives are frequently too volatile or too easily extracted, or they evince excessive migration tendencies.

The higher molecular weight and especially polymeric derivatives of sterically inhibited piperidine derivatives which have become known, however, incur the drawback when considered as light stabilizers for plastics in that they are either inadequately effective in or incompatible with the plastic that is meant to receive them.

According to the prior art, there is a problem in preparing higher molecular weight, in particular polymeric tetramethylpiperidine derivatives which are quite compatible with plastics and also stabilize them well. The stabilizing effect should be permanent, that is, the stabilizers should not be volatile in practical use, nor permit extraction, nor evince any migration tendency. The stabilizers of the present invention are especially good light stabilizers.

SUMMARY OF THE INVENTION

Having in mind the limitations of the prior art it is an object of the present invention to provide stabilizers for plastics which are polymeric tetramethylpiperidine derivatives which are compatible with the plastics, stabilize them well, and are permanent.

This object is achieved by a low molecular weight 1,3-butadiene polymer containing amino groups acting as a stabilizer for molded or unshaped plastics.

This 1,3-butadiene polymer is obtained by reacting an epoxied polybutadiene with an epoxy content of 2 to 10% by weight of oxygen according to DIN 16 945 (German Industrial Standard) with a substituted piperidine of the general formula:

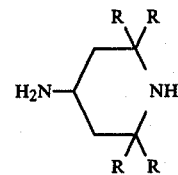

where R can be the same or different alkyl groups having 1 to 3 carbon atoms, until there is a content of 0.3 m of tetraalkyl-piperidine per 100 g of reaction product, the molecular weight ($\overline{M}n$) of the basic polybutadiene being between 500 and 6,000, its iodine number being at least 200 and its content in double bonds in the trans structure being at most 40%.

Preferably the epoxy content of the epoxied polybutadiene is 4 to 8% by weight.

In a special embodiment, the double bonds of the said piperidine groups bearing 1,3-butadiene polymer are hydrogenated up to an iodine number of at most 10.

DESCRIPTION OF THE PREFERRED EMBODIMENTS

An inherent basic polybutadiene containing at least 70 molar percent of 1,3-butadiene is suitable to produce the stabilizers. Applicable comonomers are such copolymerizing 1,3-diolefins as isoprene and 1,3-pentadiene. Such copolymerizing alpha-unsaturated monoolefins as styrene are also useful as comonomers. However, these are less preferred as comonomers.

Preferably the copolymers contain at least 90 molar percent of 1,3-butadiene and at most 10 molar percent of the comonomers.

Homopolybutadienes are particularly preferred.

The basic polymers have a molecular weight ($\overline{M}n$) between 500 and 6,000, preferably between 800 and 3,000 as determined by vapor-pressure osmometry, and an iodine number of at least 200, preferably at least 300 g of iodine per 100 g.

The 1,3-polybutadienes containing epoxy groups are prepared by such epoxidations as are illustratively described in U.S. Pat. Nos. 3,329,734; 3,321,541; 3,312,752; 3,314,617; 3,428,699; 3,789,090; 3,852,373; and 3,983,183, where this epoxidation takes place, for instance, as disclosed in U.S. Pat. No. 4,269,626, in column 7, lines 24–55, with vinyl groups possibly also being epoxied.

Terminal functionalization represents another way to obtain 1,3-butadiene polymers containing suitable epoxy groups, for instance functionalizing by means of epichlorohydrin polymers obtained by the living polymerization process. Such 1,3-butadiene polymers with end standing epoxy groups are commercially available.

The content of titrable epoxy oxygen according to German Industrial Standard DIN 16,945 in the polymers is 2 to 10 weight percent, preferably 4 to 8 weight percent. Preferably less than 40% of the olefinic double bonds in trans structure are present in the homopolymers or copolymers containing the epoxy groups.

Following its isolation, the epoxied butadiene polymer is reacted, for instance as described in U.S. Pat. No. 4,269,626, with the sterically inhibited piperidine derivative, while being heated, and thereupon it is hydrogenated catalytically, partially or completely, i.e., up to an iodine number less than 10 (g of iodine per 100 g).

Examples of a basic polymer are:

(a) a polybutadiene with a molecular weight of 1,700, and iodine number of 450 (g of iodine per 100 g), a ratio of cix/trans/vinyl of 72/27/1;

(b) a polybutadiene of molecular weight 1,050, an iodine number of 390 (g of iodine per 100 g), a ratio cis/trans/vinyl of 0/13/87;

(c) a polybutadiene with molecular weight 1,300, the iodine number 390 (g of iodine per 100 g), the ratio of cis/trans/vinyl of 20/30/50;

(d) a polybutadiene with molecular weight 1,300, the iodine number 440 (g of iodine per 100 g), the ratio cis/trans/vinyl of 49/14/37; and (e) a polybutadiene with a molecular weight of 3,300, the iodine number 440 (g of iodine per 100 g), the ratio cis/trans/vinyl or 72/27/1.

Specific examples of the reaction products of the epoxied 1,3-butadiene polymers with the substituted piperidine compound of the general formula include: 1,3-polybutadiene having a molecular weight of 1,700, an iodine number of 450, a ratio of 72 cis/27 trans/1 vinyl, epoxidized up to an epoxy oxygen content of 8.2%, reacted with 4-amino-2,2,6,6-tetramethyl-piperidine (reaction product: 37% 4-amino-2,2,6,6-tetramethyl-piperidine content);

1,3-polybutadiene having a molecular weight of 1,700, an iodine number of 450, a ratio of 72 cis/27 trans/1 vinyl, epoxidized up to an epoxy oxygen content of 8.2%, reacted with 4-amino-2,2,6,6-tetramethyl-piperidine and hydrogenated up to an iodine number of 4 (37% 4-amino-2,2,6,6-tetramethylpiperidine);

polybutadiene having a molecular weight of 1,030, an iodine number of 390, a ratio of 0 cis/13 trans/87 vinyl, epoxidized up to an epoxy oxygen content of 8.0%, reacted with 4-amino-2,2,6,6-tetramethyl-piperidine (39% 4-amino-2,2,6,6-tetramethyl-piperidine, iodine number: 90);

polybutadiene having a molecular weight of 1,300, an iodine number of 440, a ratio of 49 cis/14 trans/37 vinyl, epoxidized up to an epoxy oxygen content of 8.0%, reacted with 4-amino-2,2,6,6-tetramethyl-piperidine (38% 4-amino-2,2,6,6-tetramethyl-piperidine, iodine number: 98);

polybutadiene having a molecular weight of 1,300, an iodine number of 390, a ratio of 20 cis/30 trans/50 vinyl, epoxidized up to an epoxy oxygen content of 8.1%, reacted with 4-amino-2,2,6,6-tetramethyl-piperidine (39% 4-amino-2,2,6,6-tetramethyl-piperidine, iodine number: 95);

1,3-polybutadiene having a molecular weight of 3,300, an iodine number of 440, a ratio of 72 cis/27 trans/1 vinyl, epoxidized up to an epoxy oxygen content of 5.4%, reacted with 4-amino-2,2,6,6-tetramethyl-piperidine (30% 4-amino-2,2,6,6-tetramethyl-piperidine, iodine number: 128);

1,3-polybutadiene having a molecular weight of 3,300, an iodine number of 440, a ratio of 72 cis/27 trans/1 vinyl, epoxidized up to an epoxy oxygen content of 8.2%, reacted with 4-amino-2,2,6,6-tetramethyl-piperidine (35% 4-amino-2,2,6,6-tetramethyl-piperidine, iodine number: 115).

Specific examples of the above compounded with a costabilizer of alkali salts of hypophosphorus acids include: 99.7 weight percent of 1,3-polybutadiene having a molecular weight of 1,700, an iodine number of 450, a ratio of 72 cis/27 trans/1 vinyl, epoxidized up to an epoxy oxygen content of 8.15%, reacted with 4-amino-2,2,6,6-tetramethylpiperidine and 0.2 weight percent of sodium hypophosphite;

99.8 weight percent of 1,3-polybutadiene having a molecular weight of 1,300, an iodine number of 390, a ratio of 20 cis/30 trans/50 vinyl, epoxidized up to an epoxy oxygen content of 8.1%, reacted with 4-amino-2,2,6,6-tetramethylpiperidine and 0.2 weight percent of potassium hypophosphite;

99.5 weight percent of 1,3-polybutadiene having a molecular weight of 1,700, an iodine number of 450, a ratio of 72 cis/27 trans/1 vinyl, epoxidized up to an epoxy oxygen content of 8.15%, reacted with 4-amino-2,2,6,6-tetramethylpiperidine and 0.3 weight percent of sodium hypophosphite.

The stabilizers of the present invention are used in the polymers in a concentration from about 0.01 to 2.0, preferably from 0.1 to 1.0, in particular from 0.2 to 0.5 in weight percent as referred to the plastic to be stabilized.

Suitable plastics are homopolymers and copolymers of olefins or diolefins, polyisoprene, polybutene, polypropylene, polyethylene of low or high densities, polybutadiene or saturated or unsaturated ethylene-propylene copolymers, ethylene-butene copolymers, ethylene-vinylacetate copolymers, butadiene-styrene copolymers, butadiene-styrene-acrylonitrile copolymers, furthermore homopolymers and copolymers of styrene or its homologues such as alpha-methylstyrene or p-methylstyrene, for instance polystyrene, styrene-butadiene copolymers, also impact-resistant polystyrene types such as graft polymers of styrene with elastomers or also mixtures of homopolymers, copolymers, or graft polymers, moreover homopolymers, copolymers, and graft polymers of vinyl chloride such as polyvinyl chloride, polyvinylidene chloride, vinylchloride-vinylidenechloride copolymers, vinylchloridevinylacetate copolymers, or also polyesters such as polyethyleneterephthalate, polybutyleneterephthalate, polyetheresters or also polyurethane, polyisocyanurates, polyacrylonitrile, and their copolymers.

Especially suitable plastics are those bearing carbonamide groups, such as:

(a) polyamides, for example homopolyamides as prepared conventionally from lactams with more than 5 carbon atoms in the ring, or from the corresponding omega-amino-acids such as caprolactam, capryllactam, lauryllactam, undecyllactam, oenanthic lactam, or from alpha, omega diamines, and alpha, omega dicarboxylic acids having more than three carbon atoms between the functional groups, for instance tetramethylene diamine, hexamethylene diamine, trimethylhexamethylene diamine, isophoronic diamine, octamethylene diamine, trimethylhexamethylene diamine, isophoronic diamine, octamethylene diamine, dodecamethylene diamine and adipic acid, pimelic acid, suberic acid, azelaic acid, sebacic acid, undecanoic-diacarboxylic acid, dodecanoic-dicarboxylic acid, terephthalic acid, isophthalic acid; further the corresponding (a) copolyamides;

(c) polyether amides; and (d) polyetherester amides.

Preferably the homopolymers or copolyamides of lauryllactam are used as the plastic material. Especially suitable also are polyesters, for instance polybutyleneterephthalate, and polyetheresters, for instance those synthesized from terephthalic acid, 1,4-butanediol and poly(oxytetramethylene) glycol.

Besides the compounds of the present invention, further additives such as flame protectants, anti-electrostatic agents, plasticizers, lubricants, pigments, dyestuffs, fillers, reinforcing substances or further stabilizers such as further light stabilizers, anti-oxidants or heat stabilizers are added to the plastics.

The addition of alkali salts of hypophosphorous acid, in particular sodium salts in amounts of 0.01 to 1.5, preferably between 0.05 and 0.75, and especially between 0.1 and 0.3 in weight percent referred to the total weight of plastic is especially advantageous to stabilize plastics containing carbonamide groups.

The stabilizers of the present invention are added to the plastics using state of the art methods. For instance, they are added before or during polymerization or polycondensation to the monomers, or they are worked into the molding materials in kneaders or extrusion presses. They are also added to solutions of the plastics which are used, after solvent removal, to manufacture for instance powders for coating means, or foils. The kind of working-in depends in typical conventional manner on the kind of plastics, its manufacture or its processing. Again, the stabilizers are introduced in the manufacture of the molded articles into the molding materials or, if especially desired, they can be deposited onto the molded articles in a suitable way, for instance by being tumbled or being sprayed on. In this manner, it is possible to use the stabilizers for plastics used in the manufacture of fibers, foils, panels or other extruded or injection molded bodies. The molded or unshaped plastics also can be used in the form of latexes; also, they can be used to make foamed substances.

Plastics containing the claimed compounds in effective amounts are especially suited for the manufacture of molded articles which must retain good mechanical properties and advantageous appearance even when exposed to long illuminations, especially out in the open.

SPECIFIC EXAMPLES

Examples 1 and 2 describe the preparation of the stabilizers of the present invention in illustrative manner. In addition to the already cited characteristics, such as molecular weight, iodine number and distribution of the double bonds of the basic polymer (polybutadiene), epoxy-O content in piperidyl residue and hydrogenation iodine number, the physical properties such as volatility (determined by thermogravimetry), solubility in water and benzene, and also the extractibility by solvents such as methanol and toluene are listed (Table 1).

Table 2 lists the corresponding properties of the control materials.

Examples 3 through 11 describe more closely the uses of the stabilizers.

To test their effectiveness as light stabilizers, the epoxied polybutadienes reacted with substituted piperidines of the invention were tumbled onto polyamide-12 granulates and the mixture so obtained was homogenized in a two screw extruder. The granulates so obtained were then pressed into 1 mm thick panels and exposed to radiation adjusted by means of filters to sunlight (Ultravitalux lamps, no xenon lamps). The testing is performed on cut-off flakes about 1×3 cm by bending them in the direction of the shaded side by 180° (bending test). The time-to-rupture of the flakes was noted (Examples 3 through 7, 10, 11, Control Tests 1 through 3, Table 3). In polyetheresters synthesized from terephthalic acid, 1,4-butanediol and polytetrahydrofuran with $\overline{M}_n = 1,000$ and a polytetrahydrofuran proportion of 32% in the polyetherester, the test products were either stirred into the polyetherester melt (time of addition E) or added to the initial compounds prior to polycondensation (time of addition V). Illumination tests (German Industrial Standard DIN 53 389) and weather tests (German Industrial Standard DIN 53 387) were performed in the xenon test equipment on 1 mm thick flakes, the relative change in viscosity J (see German Industrial Standard DIN 53 728) being considered the measure of product decay; the change in viscosity is referred to the concentration (Examples 8 and 9, Control Tests 4 and 5).

EXAMPLE 1

(a) Epoxidizing the 1,3-butadiene polymer 12.5 parts by weight of polybutadiene oil with a molecular weight of 1,700, iodine number 450 (g of iodine per 100 g) and the ratio cis/trans/vinyl of 72/27/1 are dissolved in 40 parts by weight of chloroform and heated to boiling. A mixture of 5.73 parts by weight of 60% $H_2O_2$ and 1.2 parts by weight of formic acid is added dripwise within 90 minutes, whereupon the reaction mixture is kept for 5 hours at the boiling temperature. After cooling, the organic phase is washed with water until free of acid and $H_2O_2$. Most of the water is removed, the residual content is eliminated when distilling the chloroform.

After the chloroform is evacuated in vacuum, 13.9 parts by weight of a clear, colorless epoxied butadiene polymer is obtained with a 20° C. viscosity of 28.0 pa.s (98% yield). The content in epoxy oxygen according to German Industrial Standard DIN 16 945 is 8.15%. The iodine number (theoretical) is 220 (g iodine per 100 g).

Epoxied butadiene polymers with deviating oxygen contents for instance 6% epoxy oxygen content per German Industrial Standard DIN 16 945 are obtained similarly to the above procedure.

(b) Preparing the stabilizer To prepare the stabilizer of the invention, 733 parts by weight of the epoxied 1,3-butadiene polymer having an epoxy oxygen content of 8.15% per German Industrial Standard DIN 16 945 are mixed in a nitrogen atmosphere with 290 parts by weight of 4-amino-2,2,6,6-tetramethyl-piperidine and reacted while being stirred at 190° C. After 20 hours, the amine is practically quantitatively converted. The product contains 0.270 m tetramethyl-piperidine per 100 g of adduct and less than 0.5% by weight of residual epoxy oxygen.

EXAMPLE 2

300 parts by weight of the reaction product of Example 1(b) are dissolved in 700 parts of isopropanol and reacted with 13 parts by weight of Raney nickel and hydrogenated. The hydrogenation takes place in an autoclave at 110° C. and a pressure of 250 bars. After a reaction time of 8 hours, the solvent is separated and a product with 0.4% by weight of residual epoxy oxygen and an iodine number less than 4 (g of iodine per 100 g) is obtained.

Table 1 follows on the next page.

TABLE 1

| Example | Basic Polymer (before reaction) molecular weight | iodine number g of I/100 g | Double Bond Distribution cis % | trans % | vinyl % | Content In Epoxy before amination (weight %) | Content $\begin{array}{c}CH_3\phantom{xx}CH_3\\CH_3-\!\!\!\diagdown\!\!\!\diagup\!\!\!-CH_3\\N\\H\end{array}$ (weight %) | Iodine Number g of I/100 g Computed | Properties of Invention's Stabilizers Volatility (by Thermogravimetry) 2% | 50% | 80% Drop in weight at a temperature °C. of | Solubility in: Water at 100° C. | Benzine at 22° C. (weight %) |
|---|---|---|---|---|---|---|---|---|---|---|---|---|---|
| a | 1 700 | 450 | 72 | 27 | 1 | 8.2 | 37 | 105 | 225 | 385 | 430 | <0.1 | 2.5 |
| b | 1 700 | 450 | 72 | 27 | 1 | 8.2 | 37 | <4 | 200 | 385 | 475 | <0.1 | 2.5 |
| c | 1 700 | 450 | 72 | 27 | 1 | 8.2 | 22 | 145 | | | | | |
| d | 1 700 | 450 | 72 | 27 | 1 | 82 | 22 | <10 | | | | | |
| e | 1 700 | 450 | 72 | 27 | 1 | 5.8 | 13 | 280 | 300 | 420 | 475 | <0.1 | >35 |
| f | 1 050 | 390 | — | 13 | 87 | 8.0 | 39 | 90 | 250 | 400 | 460 | <0.1 | <0.2 |
| g | 1 300 | 390 | 20 | 30 | 50 | 8.1 | 39 | 95 | 250 | 380 | 450 | <0.1 | <0.2 |
| h | 1 300 | 440 | 49 | 14 | 37 | 8.0 | 38 | 98 | 275 | 410 | 470 | <0.1 | 0.5 |
| i | 3 300 | 440 | 72 | 27 | 1 | 5.4 | 30 | 128 | 325 | 400 | 475 | <0.1 | >50 |
| k | 3 300 | 440 | 72 | 27 | 1 | 8.2 | 35 | 115 | 320 | 390 | 470 | <0.1 | 0.5 |

TABLE 2

| Control Test | Stabilizer | Contents in $\begin{array}{c}CH_3\phantom{xx}CH_3\\CH_3-\!\!\!\diagdown\!\!\!\diagup\!\!\!-CH_3\\N\\H\end{array}$ (weight %) | PROPERTIES OF THE INVENTION'S STABILIZERS Thermogravimetrically determined volatility 2% | 50% | 80% drop in weight at a temperature of °C. of | Solubility in Water (100° C.) weight % | Benzine (22° C.) weight % |
|---|---|---|---|---|---|---|---|
| A | bis-(2,2,6,6-tetra-methylpiperidyl-(4)-sebacate | 58 | 210 | 290 | 305 | 0.5 | 34.5 |
| B | oligoester from succinic acid and 1-hydroxyethyl-4-hydroxy-2,2,6,6-tetramethyl-piperidine | 49 | 290 | 355 | 375 | 0.1 | >30 |
| C | 2,2,4,4-tetramethyl-3,20-diaza-7-oxa-21-oxo-dispiro[5,1,11,2]-heneicosane | 38 | 200 | 280 | 300 | <0.1 | 0.6 |
| D | 1,3-bis-[n-propyl-(2,2,6,6-tetramethyl-piperidyl-(4)-amino]-cyclobutene-diylium-2,4-diolate | 56 | 220 | 300 | 320 | 0.5 | 0.1 |

TABLE 3

| Example No. | Stabilizer | Stabilizer concentration in compound (% by weight) | 8 hour extraction from the compound with boiling methanol/chloroform (% of maximum extractible amount) | | ILLUMINATION TEST (hours exposure until ruture) without co-stabilization | with co-stabilization* |
|---|---|---|---|---|---|---|
| 3 | a | 0.25 | 3.0 | 3.4 | 642 | 1 019 |
| 4 | b | 0.25 | 4.4 | 5.8 | 654 | 1 089 |
| 5 | f | 0.25 | 3.9 | 3.8 | 608 | 1 019 |
| 6 | h | 0.25 | 3.2 | 3.5 | 652 | 1 019 |
| 7 | k | 0.25 | 3.1 | 3.6 | 602 | 992 |
| 10 | a | 0.25 | 3.0 | 3.4 | 642 | 1 163 |
| 11 | b | 0.25 | 4.4 | 5.8 | 654 | 1 147 |
| Control Tests | | | | | | |
| 1 | A | 0.25 | 68.7 | 69.9 | 547 | 725 |
| 2 | B | 0.25 | 3.6 | 4.2 | 502 | 680 |
| 3 | C | 0.25 | 83.1 | 97.2 | 566 | 796 |

*0.25 part by weight of 2-(3,5-di-tert.-butyl-2-hydroxy-phenyl)-benzotriazole
0.25 part by weight of N,N'-bis-[3-(3,5-di-tert.butyl-4-hydroxy-phenyl)-propionyl]-hexamethylene diamine
0.25 part by weight of tris-(2,4-di-tert.-butyl-phenyl)-phosphite
0.20 part by weight of NaH$_2$PO$_2$.H$_2$O

EXAMPLE 8 and 9

Together with 0.5% of N,N'-bis-[3-(3,5-di-tert.-butyl-4-hydroxy-phenyl)-propionyl]-hexamethylene diamine, the stabilizer (a) was worked into a polyetherester.

| Concentration of light stabilizer (a) in the polymer | time of addition | ILLUMINATION TEST J[ml/g] 0 | after 40 days | decay | WEATHERING TEST J[ml/g] 0 | after 40 days | decay |
|---|---|---|---|---|---|---|---|

TABLE 3-continued

| 0.35% | V | 129 | 123 | 5% | 129 | 123 | 5% |
|---|---|---|---|---|---|---|---|
| 0.35 | E | 153 | 145 | 5% | 153 | 142 | 7% |

CONTROL TESTS 4 and 5
The procedure was the same as for Examples 8 and 9, but 0.5% - weight of the control material was used as the light stabilizer.

| 0.5% | V | 171 | 108 | 37% | 171 | 128 | 25% |
|---|---|---|---|---|---|---|---|
| 0.5% | E | 165 | 152 | 8% | 165 | 147 | 11% |

In this instance the decay of the polyetheresters was higher, even though they contained twice as much nitrogen (290 ppm) acting as an effective radical trapper, due to the stabilizer, than present in the polyetheresters outfitted with the products of the invention (132 ppm).

EXTRACTION AND SUBLIMATION TESTS
Two polyetherester granulates, only stabilized with the stabilizer (a), and two polyetherester granulates, only stabilized with the control stabilizer (A), are extracted for 8 hours in boiling methanol and boiling toluene respectively and are stored in vacuum for 24 hours at 195° C. The nitrogen content of the polyetheresters was determined in these tests.

| Stabilizer concentration in the polyetherester | Time of addition | ppm N, theor. | initial granulate | ppm N in the polyetherester | | |
|---|---|---|---|---|---|---|
| | | | | after 8 h/65° Methanol | after 8 h/110° Toluene | after 24 h/195° 1 mbar |
| 0.7% a | V | 528 | 510 | 510 | 480 | 470 |
| 0.7% a | E | 528 | 520 | 490 | 480 | 500 |
| 1% A | V | 580 | 54 | 12 | 35 | 16 |
| 1% A | E | 580 | 570 | 120 | 310 | 150 |

While the polymeric stabilizer (a) remains practically without losses during the operations in the polyetherester, the low molecular weight control stabilizer (A) is easily extracted and sublimated. When added to the initial compounds, it was already lost by about 90% at the polycondensation conditions of 5 h/230° C/1 mbar.

What we claim is:

1. Light stabilized plastics comprising about 0.01 to 2 percent by weight based on the weight of said plastics of a stabilizer comprising an amino group bearing 1,3-butadiene polymer prepared by reacting an epoxidized polybutadiene having an epoxy oxygen content of about 2 to 10% by weight with a substituted piperidine having the general formula

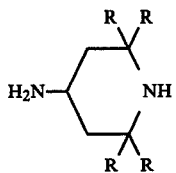

to form a reaction product where R represents similar or different alkyl groups having 1 to 3 carbon atoms, and said reaction product has a content of 0.3 m tetraalkylpiperidine/100 g of said reaction product, where said epoxidized polybutadiene is prepared from a basic polybutadiene having a molecular weight ($\overline{Mn}$) between 500 and 6,000, an iodine number greater than about 200, and a trans structure having a double bond content of not more than about 40%.

2. The light stabilized plastics of claim 1, wherein said basic polybutadiene has a molecular weight ($\overline{Mn}$) between 1,000 and 3,000 and a cis content between 70 and 80% of said double bonds present.

3. The light stabilized plastics of claim 1, wherein said double bonds of said basic polybutadiene are hydrogenated to a maximum iodine number of 10.

4. The light stabilized plastics of claim 1, further comprising costabilizers in a concentration of about 0.01 to 1.5 percent by weight based on the weight of said plastics comprising alkali salts of hypophosphorous acid.

5. The light stabilized plastics of claim 1, wherein said plastics are thermoplastics selected from the group of polymers having ester groups, carbonamide groups and mixtures thereof.

6. The light stabilized plastics of claim 5, wherein said plastics are polyamides.

7. A method of light stabilizing plastics comprising:
   (a) epoxidizing a 1,3-polybutadiene having a molecular weight ($\overline{Mn}$) between about 500 and 6,000, an iodine number greater than about 200, and a trans structure having a double bond content not more than about 40% to form an epoxidized polybutadiene having an epoxy oxygen content of about 2 to 10% by weight,
   (b) reacting said epoxidized polybutadiene with a substituted piperidine having the general formula

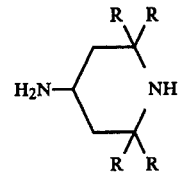

to form a reaction product where R represents similar or different alkyl groups having 1 to 3 carbon atoms, and said reaction product has a content of 0.3 m tetraalkylpiperidine/100 g of said reaction product; and
   (c) mixing said reaction product with said plastics in a concentration of about 0.01 to 2 percent by weight of said reaction product in said plastics.

8. The method of claim 1, wherein said 1,3-polybutadiene has a molecular weight ($\overline{Mn}$) between 1,000 and 3,000, and a cis content between 70 and 80% of said double bonds present.

9. The method of claim 7, wherein said double bonds of said epoxidized polybutadiene are hydrogenated to a maximum iodine number of 10.

10. The method of claim 7, further comprising mixing said reaction product and said plastics with about 0.01 to 1.5% by weight of alkali salts of hypophosphorous acid as co-stabilizers.

11. The method of claim 7, wherein said plastics are thermoplastics selected from the group of polymers having ester groups, carbonamide groups, and mixtures thereof.

12. The method of claim 11, wherein said plastics are polyamides.

* * * * *